US 8,111,704 B2

(12) United States Patent
Singhal et al.

(10) Patent No.: US 8,111,704 B2
(45) Date of Patent: Feb. 7, 2012

(54) MULTIPLE COMPRESSION TECHNIQUES FOR PACKETIZED INFORMATION

(75) Inventors: Abhishek Singhal, Santa Clara, CA (US); Debendra Das Sharma, Santa Clara, CA (US); Jesus Palomino, Guadalajara (MX); Mario A. Rubio, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 12/492,304

(22) Filed: Jun. 26, 2009

(65) Prior Publication Data

US 2010/0329255 A1  Dec. 30, 2010

(51) Int. Cl.
*H04L 12/28* (2006.01)
*H04J 3/24* (2006.01)

(52) U.S. Cl. ........................................ 370/401; 370/474
(58) Field of Classification Search .................. None
See application file for complete search history.

(56) References Cited

U.S. PATENT DOCUMENTS

| | | | |
|---|---|---|---|
| 6,009,488 A | 12/1999 | Kavipurapu | |
| 6,760,345 B1 | 7/2004 | Rosengard | |
| 6,804,238 B1 * | 10/2004 | Euget et al. | 370/392 |
| 6,865,164 B1 * | 3/2005 | Scribano et al. | 370/328 |
| 6,963,570 B1 * | 11/2005 | Agarwal | 370/395.32 |
| 7,170,866 B2 * | 1/2007 | Lee et al. | 370/311 |
| 7,318,017 B2 * | 1/2008 | Swoboda | 370/394 |
| 7,793,001 B2 * | 9/2010 | Black | 370/477 |
| 2002/0069042 A1 * | 6/2002 | Swoboda | 703/19 |
| 2003/0091053 A1 * | 5/2003 | Tzannes et al. | 370/395.1 |
| 2003/0152073 A1 | 8/2003 | Bunce et al. | |
| 2004/0114634 A1 * | 6/2004 | Liu | 370/521 |
| 2004/0177275 A1 | 9/2004 | Rose et al. | |
| 2004/0246966 A1 * | 12/2004 | Wu et al. | 370/395.1 |
| 2005/0195832 A1 * | 9/2005 | Dharmapurikar et al. | 370/395.31 |
| 2006/0098686 A1 * | 5/2006 | Takakuwa et al. | 370/470 |
| 2007/0147426 A1 | 6/2007 | Sharma et al. | |
| 2008/0109565 A1 | 5/2008 | Ajanovic et al. | |
| 2008/0117906 A1 * | 5/2008 | Xie | 370/392 |
| 2008/0117908 A1 * | 5/2008 | Kuo et al. | 370/392 |
| 2008/0151903 A1 * | 6/2008 | Wu et al. | 370/395.1 |
| 2008/0310344 A1 * | 12/2008 | Krishnan et al. | 370/328 |
| 2009/0092064 A1 * | 4/2009 | Fan et al. | 370/255 |
| 2009/0281984 A1 * | 11/2009 | Black | 707/1 |
| 2010/0040067 A1 * | 2/2010 | Hao et al. | 370/395.32 |
| 2010/0142560 A1 * | 6/2010 | Sharivker et al. | 370/475 |

FOREIGN PATENT DOCUMENTS

KR   10-2002-0006149   1/2002
KR   10-0745782        8/2007

OTHER PUBLICATIONS

Wikipedia, "Huffman Coding," http://en.widkipedia.org/wiki/Huffman_coding, pp. 1-9 (accessed Jun. 25, 2009).

(Continued)

*Primary Examiner* — Chirag Shah
*Assistant Examiner* — Joshua Smith
(74) *Attorney, Agent, or Firm* — Trop, Pruner & Hu, P.C.

(57) ABSTRACT

In one embodiment, the present invention includes a method for comparing a packet header to a stored packet header, generating a comparison vector based on the comparison, and transmitting the packet from the transmitter without the packet header if the packet header and the stored packet header match. A data portion of the packet may be compressed and transmitted using a different compression technique. Other embodiments are described and claimed.

14 Claims, 7 Drawing Sheets

OTHER PUBLICATIONS

"Adaptive Huffman Compression," http://www.cs.sfu.ca/CC/365/li/squeeze/AdaptiveHuff.html, pp. 1-3 (accessed Jun. 25, 2009).
Liang-Wei Lee, "Dynamic mapping technique for adaptive Huffman code," Oct. 19-21, 1993, pp. 653-656.

Korean Patent Office, Combined Search Report and Written Opinion for PCT Application No. PCT/US2010/027130, dated Sep. 28, 2010, 9 pgs.

* cited by examiner

MULTIPLE COMPRESSION TECHNIQUES FOR PACKETIZED INFORMATION

BACKGROUND

In current computer architectures, application bandwidth requirements are increasing exponentially. This is true for both memory and input/output (IO) subsystems. Also, recently it has been observed that supporting this exponential growth in bandwidth on existing interconnects has become increasingly difficult because of engineering as well as industry enabling challenges.

An example of this trend is seen in the available speeds of upcoming generations of the well-known Peripheral Component Interconnect Express (PCIe™) interconnect technology. Specifically, for the upcoming PCIe™ Generation (Gen) 3.0 signaling speed, it was desired that the bandwidth should be doubled from the current PCIe™ Gen 2.0 levels (5.0 giga transfers per second (GT/s)) in accordance with the PCI Express™ Specification Base Specification version 2.0 (published Jan. 17, 2007) (hereinafter the PCIe™ Specification). However, because of engineering challenges, the industry compromised by adopting slower (8.0 GT/s vs. 10.0 GT/s) speeds and not performing 8 b/10 b encoding to achieve bandwidths close to 10.0 GT/s. Various techniques will be needed in enabling the technology to keep pace with industry bandwidth requirements.

One such technique is compression. Over the years, compression has been successfully used in a variety of interconnect systems. However, such known compression techniques can suffer from complexity and overhead costs that diminish their utility.

DETAILED DESCRIPTION

Figure 1:
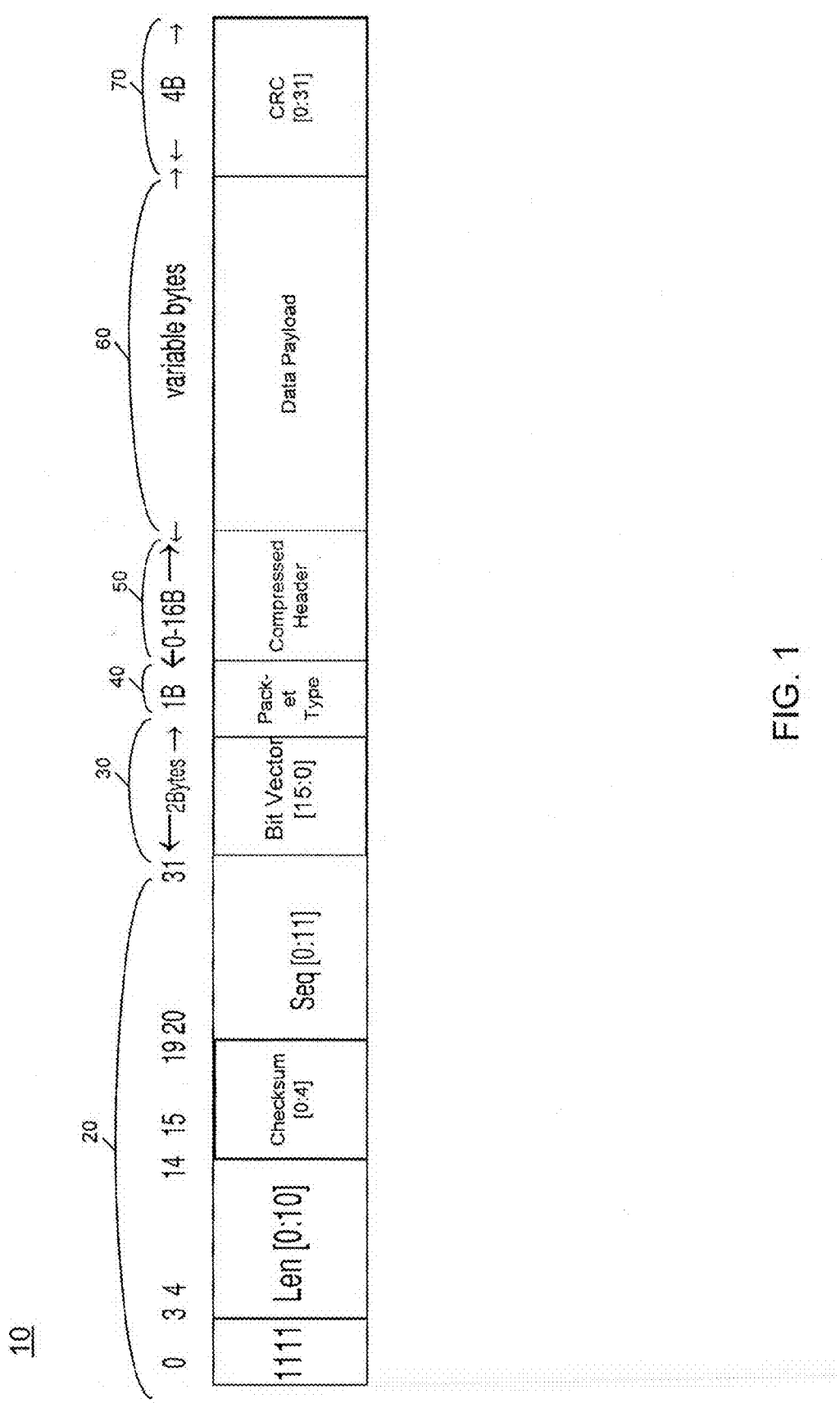
FIG. 1 is a block diagram of a packet in accordance with one embodiment of the present invention.

In various embodiments, data transmission across an interconnect such as a PCIe™ interconnect in accordance with PCIe™ Gen 2 or Gen 3 or another such protocol may be improved by providing compression techniques. In many implementations, different techniques may be used to compress header and data portions of a packet. Specifically, different characteristics of headers and data can be leveraged to apply an appropriate compression technique. For a typical point-to-point (PtP) interconnect, various components of the header portion of the packet remain unchanged. For example, in a PCIe™ header time code (TC), transaction layer packet (TLP) digest (TD), attributes (Attr), AT, Length, Requester ID, Tag, BE and upper bits of an address portion remain unchanged for a series of requests from an agent on a PCIe™ endpoint. Embodiments may take advantage of this commonality of bits. Understand that while described herein with regard to a PCIe™ implementation, embodiments can apply to other interconnect techniques.

A storage may be provided in a transaction layer (on both receive and transmit sides) to store packet headers. In one embodiment, each sender and receiver side of the transaction layer may maintain a storage (e.g., 4 double words (DWs) where a DW is 4 bytes or 32 bits)) for the most common request types that it can receive. Empirical data shows that most (e.g., >90%) request types can be from a small number of such types (e.g., non-posted (NP) read requests, memory reads (MRds), posted memory writes (MWr) or completions with data (CPLD)). Each such storage may include a plurality of entries (each of 4 DW for example) to maintain a copy of all the header bits of the last packet received of a request type.

In addition, packet match logic may be provided. For the sender transaction layer, such logic may perform a comparison in each byte of a packet header to be transmitted (the bytes stored in the storage can be initialized to all zeroes) and prepare a bit vector including information regarding the bytes that match the bytes of the previous packet (of that type). Thus based on this comparison, a bit vector may be prepared. The vector (e.g., 16 bits) tracks which bytes found a successful match with a byte in the same location on the previously sent packet of the same type. Note that comparison can be performed at differing granularities, such as at more than a byte level. For example, one can compare 8 pairs of two byte (2 B) header portions and send an 8 bit vector instead, providing better comparison at the cost of lower probability of finding a match.

During packet transmission, this bit vector is then appended (e.g., as a prefix) to the packet. In another variation, a bit in a physical layer field of the packet can indicate whether the header carries this comparison vector. This can be useful to minimize the overhead of the comparison vector for cases where little compression is achieved, as will be described further below. As one example, the latter variation is useful to minimize overhead in cases where little commonality is seen between two subsequent requests of the same type.

Referring now to FIG. 1, shown is a block diagram of a packet in accordance with one embodiment of the present invention. While described herein in the context of a PCIe™ Gen3 packet, it is to be understood that embodiments may be applicable to any packet-based communication scheme. As seen in FIG. 1, packet 10 includes various portions including header and data portions. Portions 20 and 70 may correspond to link and physical layer headers and may include various information such as a predetermined code, a length value, a checksum value and a sequence value, all of which may be incorporated in first portion 20. In addition, a cyclic redundancy checksum (CRC) portion may be present in final portion 70. In between these two header portions, a comparison vector 30 as described herein (and which in various embodiments may be a two byte portion) may provide the basis for compression of a header. A type portion 40 may indicate a type of packet and which may be used by a receiver to determine an appropriate storage buffer from which to obtain a stored packet header. Following this, a compressed header portion 50 may be provided. Depending on the amount of commonality between an incoming packet header and a corresponding stored packet header, this header may be between 0 and 16 bytes in a PCIe™ implementation. Following this header portion, a data payload portion 60 may be provided. As discussed herein, this payload portion may be compressed according to a different compression technique. While shown with this particular implementation in the embodiment of FIG. 1, the scope of the present invention is not limited in this regard.

The header bytes corresponding to the locations in the comparison vector that show a logical '1' value are not sent from the transmitter to the receiver, thus reducing the amount of header to be transmitted. Instead, it is assumed that receiver side logic maintains a copy of the previous request of the same type and recovers the missing bytes from the stored copy using the comparison vector. Thus for packet recreation, the receiver side transaction layer receives the compressed header and recreates the packet header by examining the comparison vector and retrieving the "missing/unsent" bytes from its copy of the packet header stored in its storage that was last sent.

Figure 2:
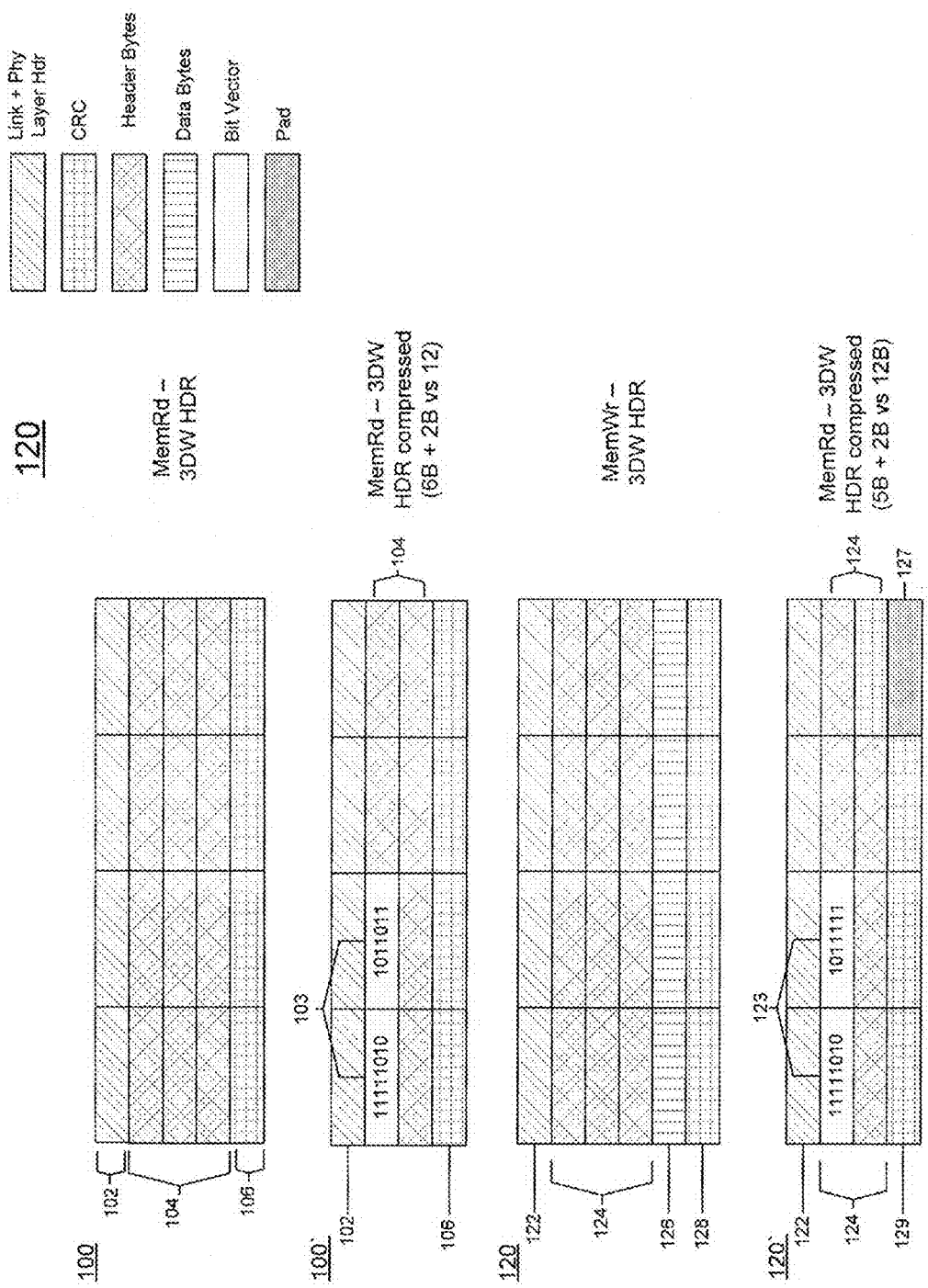
FIG. 2 provides example packet headers both before and after compression in accordance with an embodiment of the present invention.

Using embodiments of the present invention, varying amounts of compression of the header portion of packets can be realized. Referring now to FIG. 2, shown are example TLP headers both before and after compression in accordance with an embodiment of the present invention. As shown in FIG. 2, header 100, which may be a memory read (MemRd) packet type may have a TLP header portion 104 that is three double words (i.e., 12 bytes). In addition, a link and physical layer header 102 is present, along with a trailing link and physical layer header portion 106. As seen, after compression header packet 100' includes a bit vector 103 which identifies the commonality between the header portion of the packet and a stored header for the last transmitted packet of the same type (i.e., the last MemRd packet). Following this is a header portion 104, which includes the non-matching portions of these two headers. As seen, a reduction of four bytes is realized.

Similarly, compression savings can be realized for other packet types. As seen in FIG. 2, a memory write header (MemWr) includes a TLP header portion 124 that is four double words (i.e., 16 bytes) wide. This is in addition to link and physical layer headers 122 and 126 and a data portion 128. As seen in compressed header portion 120', a bit vector 123 is present, which enables a reduced header portion 124 to be transmitted. In the example shown, a five byte header portion is sent, rather than the 16 byte header portion of packet 120, enabling a bandwidth savings. Also seen is a pad byte 127 at the end of the packet. While shown with these particular examples, the scope of the present invention is not limited in this regard.

Figure 3:
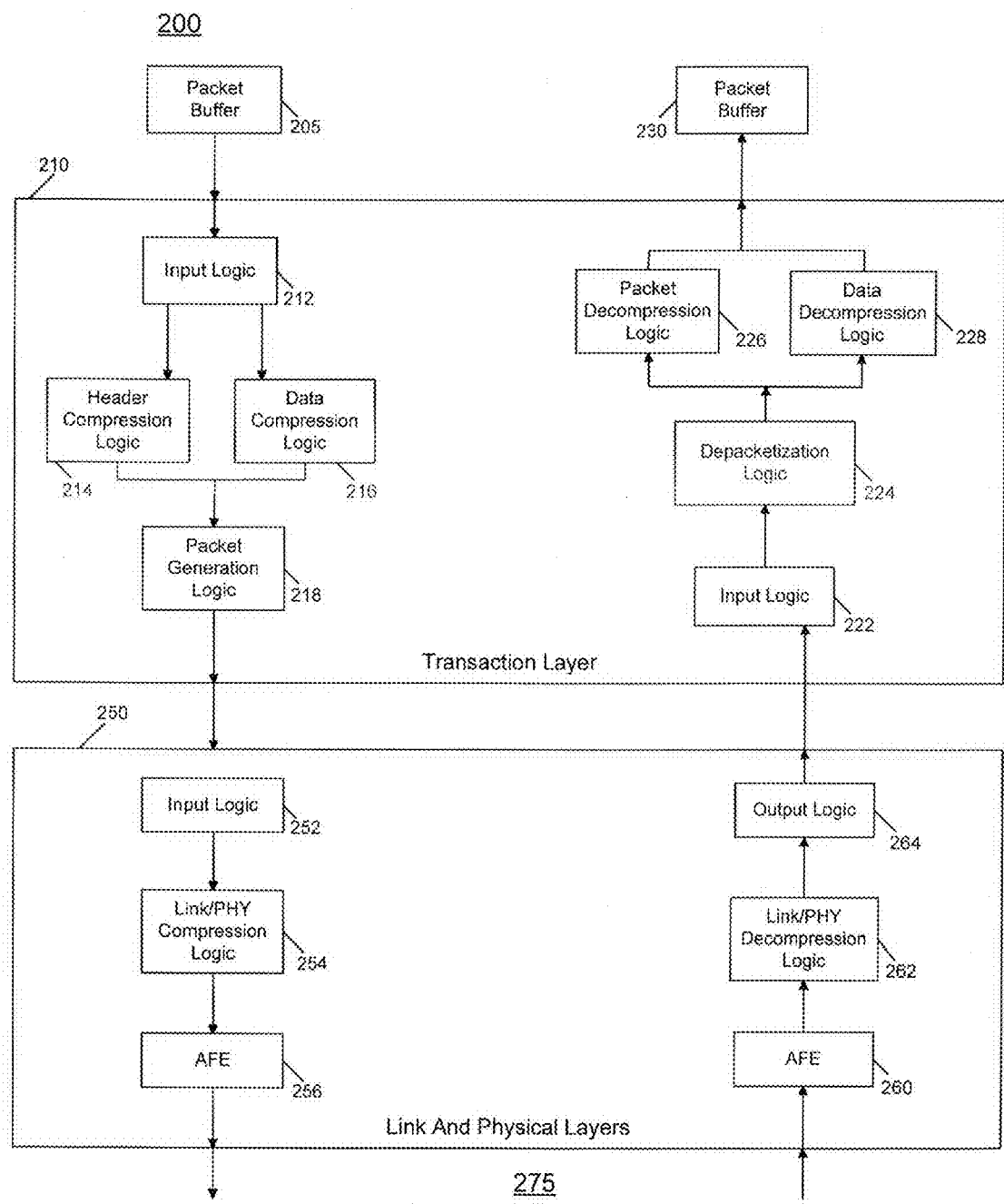
FIG. 3 is a block diagram of a portion of a semiconductor device in accordance with an embodiment of the present invention.

Embodiments may be incorporated into many different interconnect types. Referring now to FIG. 3, shown is a block diagram of a portion of a semiconductor device in accordance with an embodiment of the present invention, such as a processor, chipset, peripheral device or so forth that communicates via a link such as a PCIe™ link. As shown in FIG. 3, transactions for transmission across a link 275 (e.g., a PtP link) may be received from logic of the device in a packet buffer 205, which may be a first-in first-out (FIFO) buffer, in some implementations. While shown for ease of illustration as a single buffer, understand that in different embodiments, multiple such buffers may be present for different header types as well as different types of data. Incoming transactions may be provided to a transaction layer 210, and more specifically to an input logic 212 which may perform various functions such as arbitrating among multiple such transactions and preparing a packet before transmission. Input logic 212 may provide various information to one or more compression engines such as a header compression logic 214 and a data compression logic 216. This is so because due to the different types of information present in header and data portions of a packet, different compression techniques may be used. When an appropriate compression methodology has been performed (when enabled), the compressed information may be provided to a packet generation logic 218 which may generate a packet therefrom. Then the packets may be output to link and physical layers 250, which may include input logic 252, compression logic 254, which in various embodiments may be an optional engine to perform compression on link and physical layer header portions of a packet. Finally, the packet may be transmitted along link 275 after conditioning in an analog front end (AFE) 256 (which may connect to the physical layer, in one embodiment). While shown with these high level views for ease of illustration, understand that additional logic and structures may be present in a particular implementation. Similar circuitry is present in a receive direction from link 275 such that incoming packets are processed in link and physical layers 250 and are provided to transaction layer 210 for further processing, including in depacketization logic 224, and decompression of the header and data portions using decompression logics 226 and 228, which act to decompress the header and data portions as described above.

Figure 4:
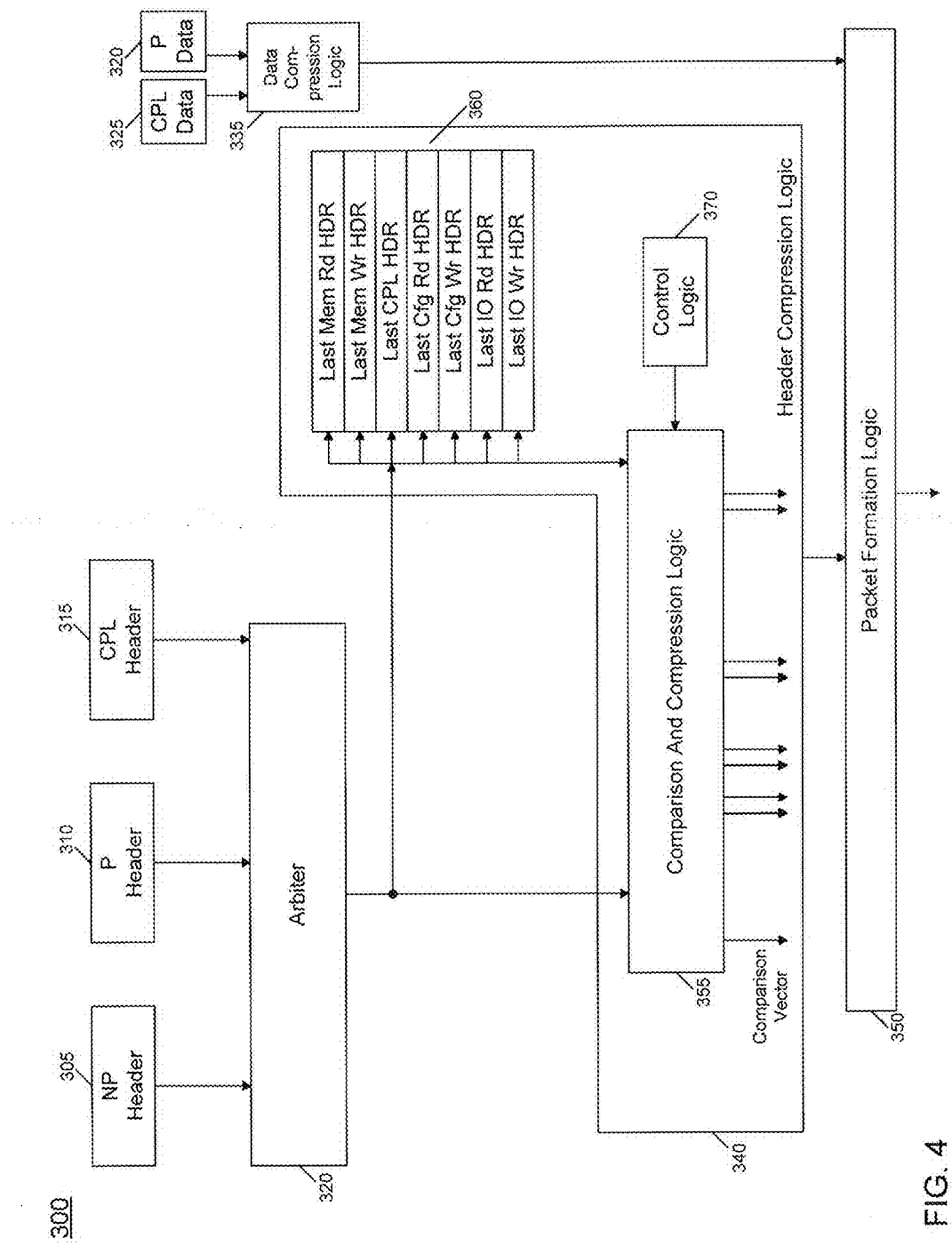
FIG. 4 is a block diagram of a header compression engine in accordance with one embodiment of the present invention.

Referring now to FIG. 4, shown are further details of a header compression engine in accordance with one embodiment of the present invention. As shown in FIG. 4, a transaction layer 300 may include various components, including a compression engine 340. Incoming headers may be stored in various FIFOs, each associated with the most common types of packets to be transmitted. Namely a non-posted header buffer 305, a posted header buffer 310, and a completion (CPL) header buffer 315 may output header to be provided to an arbiter 320, which arbitrates among such different packet types and provides a winning packet to a header compression logic 350, where the header is provided to a comparison and compression logic 355, which may be a bytewise comparator to compare the incoming header with a corresponding stored header of the same type. More specifically, a header buffer 360 may include a plurality of entries, each storing the last header of a given packet type. As seen in FIG. 4, such entries may include last memory read and write headers, last completion headers, last configuration read and write headers, and last IO read and write headers. Note that header buffer 360 is constantly updated (i.e., the stored packet header is replaced) with the packet header that was just received. While shown with these particular examples in the embodiment of FIG. 4, additional or different headers may be stored in other embodiments.

Comparison and compression logic 355 may generate a comparison vector, which may be two bytes, to cover up to 16 bytes of header information, in which each bit corresponds to a byte of the comparison, where a logic one level indicates a match and a logic zero level indicates a mismatch. Based on this comparison vector and the header information a packet formation logic 350 may form a packet from this information and data (if present). Thus, only those portions of the header that are different (i.e., that correspond to a logic zero) are sent. In addition, compression engine logic 340 may further output a type indicator to indicate a type of packet corresponding to the header.

Further in some cases, a controller (e.g., control logic 370) may limit the amount of compression to conform to packet alignment requirements, e.g., for PCIe™ all packets are a multiple of four bytes. In an embodiment which requires that the header packet be 4DW certain bytes may be chosen to not be compressed. Suppose 13 bytes show a match (byte 0 is never compressed), then the resultant header packet would have 1 B packet type plus 2 B header plus 2 B, which did not find a match to give a total of 5 B. Instead, three more bytes may be sent uncompressed (any three) such that the resultant packet is 8 B (or two Dwords). Note that in various implementations, either as part of compression engine 340 via control logic 370 or separate therefrom, a controller can determine whether compression should be allowed or disabled. That is, if based on a number of comparisons it is determined that compression is not improving performance (i.e., due to relatively little commonality between packets) the compression performed by compression engine 340 may be disabled. This can be based on usage and compression ratio monitoring on an ongoing basis on the data being transferred.

Note that a separate data path may provide data from data buffers 320 and 325 to a data compression logic 335, where if enabled a different compression technique may be applied to the data. The (possibly) compressed data is then sent to packet formation logic 350, where a complete packet is formed and output to, e.g., a link layer. While shown with this particular implementation in the embodiment of FIG. 4, other circuitry and logic can be used to performed compression in other embodiments.

Figure 5:
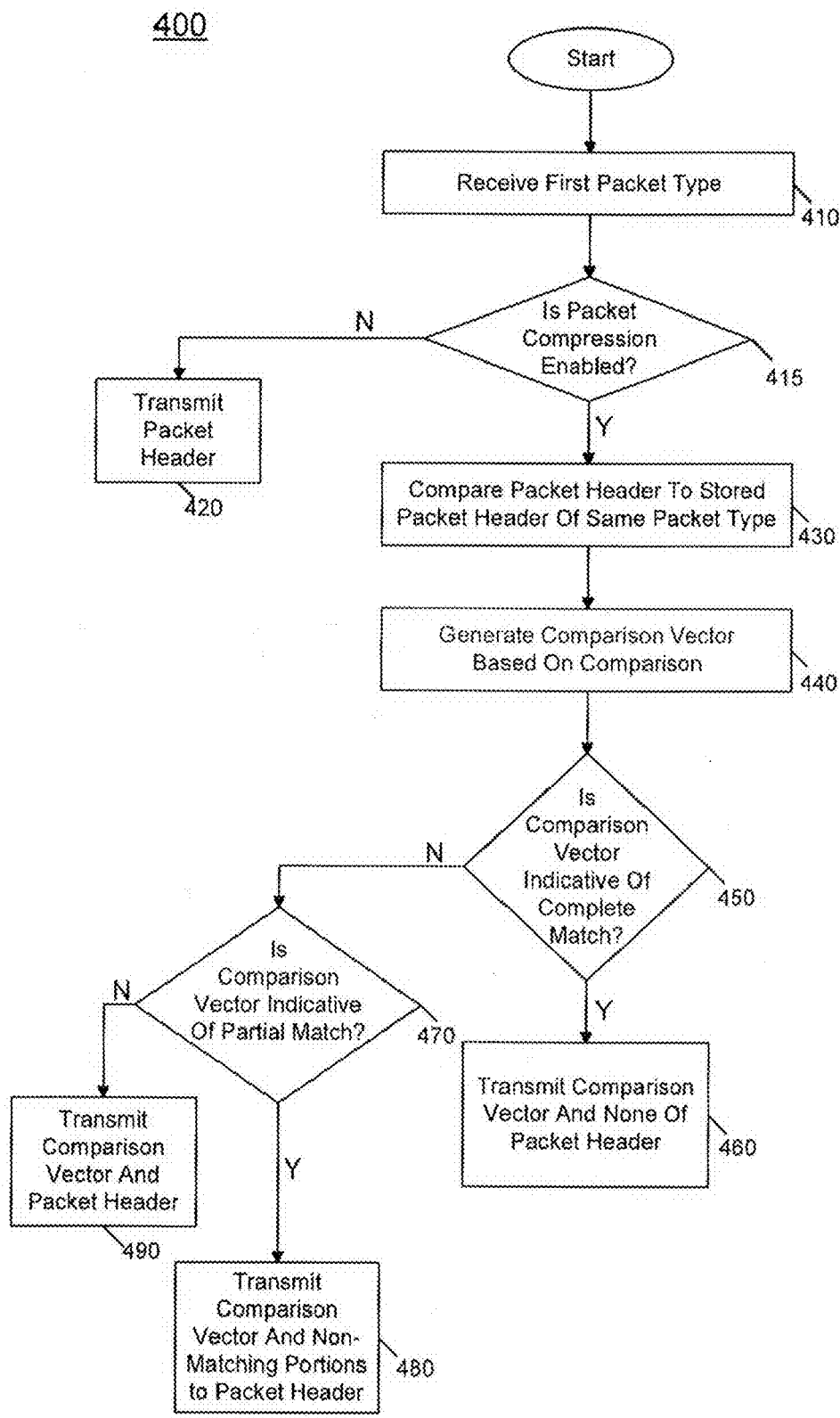
FIG. 5 is a flow diagram for performing header compression in accordance with an embodiment of the present invention.

Referring now to FIG. 5, shown is a flow diagram for performing header compression in accordance with an embodiment of the present invention. As shown in FIG. 5, method 400 may be performed in a transaction layer of a transmitter. Method 400 may begin by receiving a first packet type (block 410). It may then be determined whether packet compression is enabled. If not, the packet header may be transmitted (block 415) and the method concludes.

Otherwise, control passes to block 430 where the packet header is compared to a stored packet header of the same packet type. As described above, this stored packet header may be present in a header buffer of the transaction layer. Then a comparison vector may be generated based on the comparison. As discussed above in one implementation a bit vector may be generated in which each bit has a first value to indicate a match between corresponding bytes of the two headers and a second value to indicate mismatch. Next it may be determined whether the comparison vector is indicative of a complete match (block 450). If so, the comparison vector maybe transmitted alone, without any of the packet header (block 460). Otherwise, control passes to diamond 470 where it is determined if there is at least a partial match. If so, the comparison vector and the non-matching portions of the packet header may be transmitted (block 480). Instead, if none of the portions of the headers match, control passes to block 490 where the comparison vector and the full packet header are both transmitted. While shown with this particular implementation in the embodiment of FIG. 5, the scope of the present invention is not limited in this regard. Understand that decompression may occur in a generally inverse manner such that the comparison vector is used to obtain a stored packet header of a given type and for any matching portions for which the header was not sent, the stored header buffer may be used to thus recreate the desired header portion. Note that in both transmit and receive cases, the incoming packet is stored in the header buffer for future comparisons.

Variability in data is much larger than in header packets. For this seemingly random data, more advanced compression techniques can be used. Dictionary based compression methods utilize frequency of symbols (typically bytes) to produce more effective encoding of information (in this case data bits). One such compression technique is the Huffman algorithm, which is used for lossless data communication. The Huffman algorithm assumes that the frequency of symbols in a data set has been pre-computed. A variation of this algorithm called the adaptive Huffman algorithm continuously builds the frequency table of transmitted and sent symbols on both the transmitter and receiver sides.

The frequency table for the packets that have been transmitted is updated with frequency of each symbol (a symbol can be a byte for example) that has been transmitted. An array can be stored which defines a variable length code for each symbol based on frequency (shorter codes for more frequently used symbols) is then rebuilt after each packet transmission. Compression logic based on Huffman algorithm can be implemented in hardware. Such implementations can include building of the encoding array based on frequency of symbols, as reflected in the frequency table.

In various embodiments, a variation of an adaptive Huffman algorithm can be adopted for compressing the data portion of packets. That is, the Huffman tree can be built less frequently (once every "N" packets, where N is a programmable value set through software). While the scope of the present invention is not limited in this regard, N may be between 100 and 1000 in some embodiments. By doing so, it is possible to build a high latency pipeline to compute the Huffman tree.

Alternative compression techniques can be used as well. In one embodiment only the 16 most frequent symbols might be encoded. For example, 00, 01, 03, 04 . . . 0F are encoded with only 5 bits, i.e., 0 followed by actual binary representation. The remaining 240 symbols can be encoded in 9 bits "1" followed by 8 bit representation. Still other implementations are possible.

Figure 6:
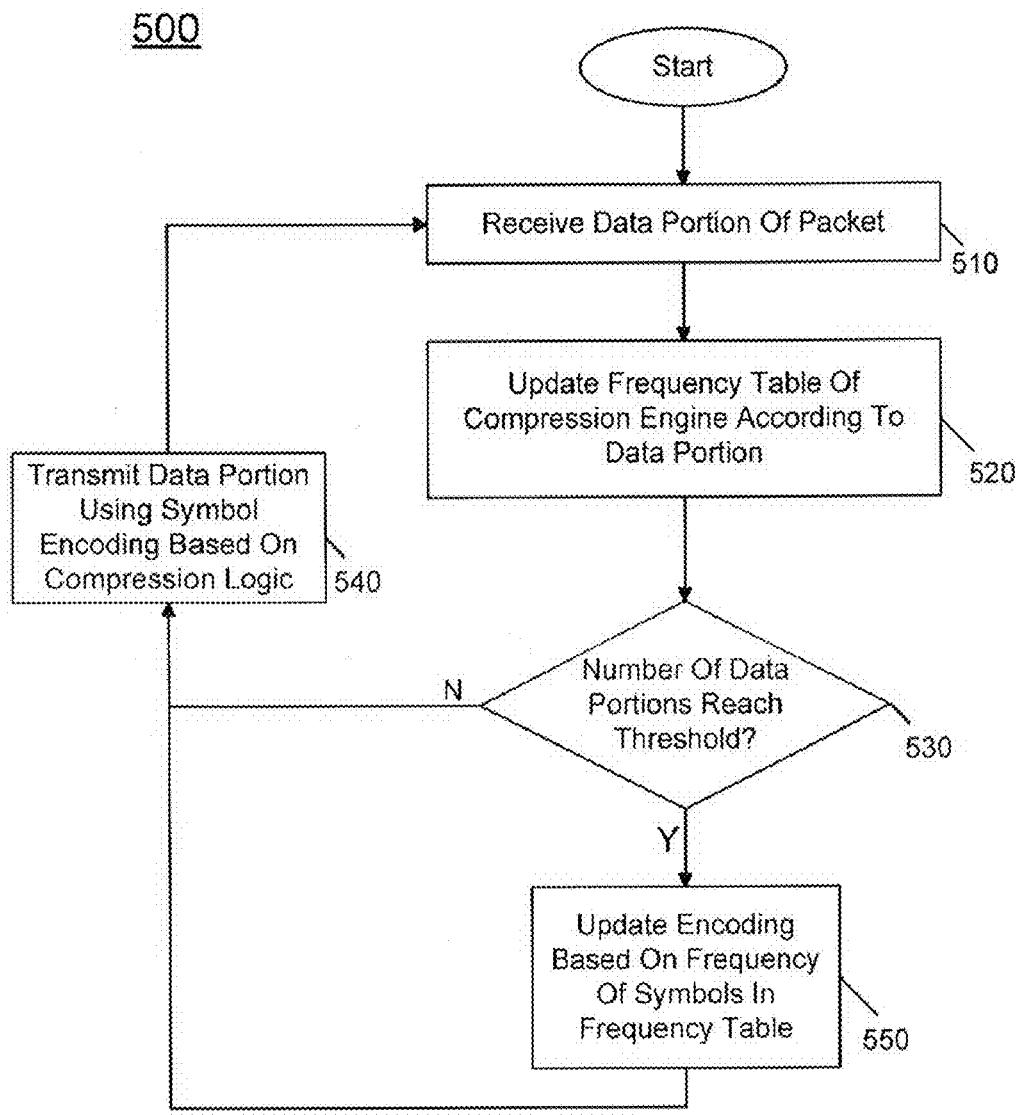
FIG. 6 is a flow diagram of a compression method for data packets in accordance with an embodiment of the present invention.

As discussed above, a different compression techniques can be used for the data portion from the above bit vector-based compression technique for the header. Referring now to FIG. 6, shown is a flow diagram of a compression method for data portions of a packet in accordance with an embodiment of the present invention. As shown in FIG. 6, method 500 may begin upon receipt of a data portion of a packet (block 510). Based on the symbols in the packet (e.g., bytes) a frequency table of a compression engine (such as the data compression logic of FIG. 3) may be updated (block 520). In some embodiments, header compression and data compression and link layer packet compression (e.g., credit and acknowledgment packets in PCIe™) might use similar dictionary based compression techniques. In such an embodiment, the frequency table for each packet type is separate.

Then it may be determined whether the number of received data portions since a last updating of a structure of the compression engine has been reached (diamond 530). If not, the data portion may be encoded using the symbol coding based on logic compression and the data portion is transmitted (block 540).

If instead at diamond 530 it is determined that the number of data portions reaches the threshold, control passes to block 550 where an encoding of the compression engine may be updated based on a frequency of symbols in the frequency table. Control then passes to block 540, discussed above, where the data portion may be compressed using the updated encoding and sent accordingly.

Thus embodiments provide a "lazy update" of a frequency table, which has little impact on efficiency of compression. In an example embodiment using PCIe™ data traffic, there is substantially no loss in compression efficiency as a result of using a lazy update technique as described herein. In one embodiment, if one builds the array once every 100 packets or so, it is possible to achieve good bandwidth reduction.

While the embodiments described above are with regard to Huffman and modified adaptive Huffman algorithms, other implementations can use another dictionary and frequency-based algorithm. Thus in various embodiments, the a priori knowledge of the structure and relative repeatability packet headers enables use of high compression via bit vectors for the header, and instead dictionary plus frequency-based algorithms can be used for data sections of the packets. The choice algorithm for data compression can be based on ease of implementation.

As to checksum portions of a packet, there may be little benefit in compression of such portions because of the near random nature of CRC bits. In fact, the performance of an adaptive Huffman algorithm may suffer, as it skews the distribution of symbols for the data payload, and compressed CRC cannot be sent over an error-prone interconnect. Accordingly, in various embodiments, the frequency distribution of bits in the checksum should not be merged with frequency distribution of a data payload. Some implementations may choose to not compress checksum information as their overhead is small, or a separate compression engine for this information may be provided. Similarly, credit packets may have a separate compression engine and frequency table. In some embodiments credits can be compressed based on the bit-vector technique described relative to the header compression.

By combining separate schemes for header and data portions of packets, a high degree of compression can be achieved. This scheme reduces bandwidth and thus presents an opportunity to obtain bandwidth at a given frequency or reduce the incremental change in frequency from one interconnect generation to next. In some implementations, reduction in TLP bandwidth can be on the order of 50-60%. Individual applications can see up to 2× reduction in bandwidth, as header traffic dominates for client applications. However, variable encoding of data portions provides significant upside as well, which may be more pronounced in server applications. Embodiments may also decrease dynamic power, since less data is sent through interconnect lanes. Thus while industry standards stay at Gen2 or Gen3 speeds (5.0 GT/s or 8 GT/s), platforms using an embodiment of the present invention can provide higher bandwidth with little additional logic.

Figure 7:
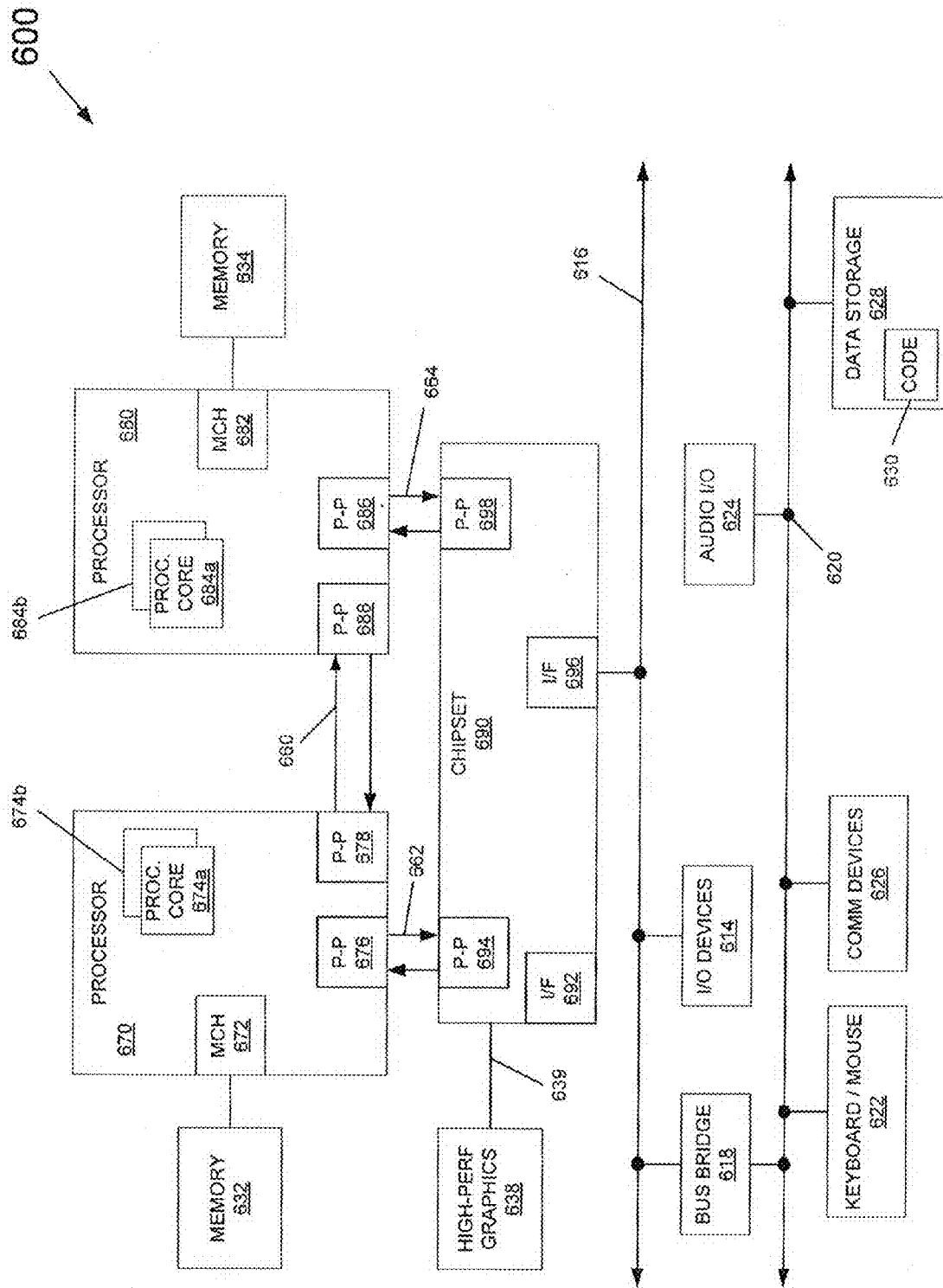
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b).

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of main memory (e.g., a dynamic random access memory (DRAM)) locally attached to the respective processors. First processor 670 and second processor 680 may be coupled to a chipset 690 via P-P interconnects 652 and 654, respectively. As shown in FIG. 7, chipset 690 includes P-P interfaces 694 and 698. Note that one or more of the components may include compression circuitry in accordance with one embodiment of the present invention to perform packet header and payload compressions as discussed herein.

Furthermore, chipset 690 includes an interface 692 to couple chipset 690 with a high performance graphics engine 638. In turn, chipset 690 may be coupled to a first bus 616 via an interface 696. As shown in FIG. 7, various I/O devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
comparing a packet header of a packet input to a transmitter to a stored packet header corresponding to a previous packet of the same type as the packet sent from the transmitter;
generating a comparison vector based on the comparison, the comparison vector having a plurality of bits each to indicate whether a portion of the packet header matches a corresponding portion of the stored packet header;
transmitting the packet from the transmitter without the packet header and with the comparison vector if the packet header and the stored packet header match; and
compressing a data portion of the packet with a different compression technique and updating a frequency table of the different compression technique with information regarding each packet transmitted, and updating a tree of the different compression technique only once per a predetermined number of packets transmitted.

2. The method of claim 1, further comprising transmitting a portion of the packet header with the packet, wherein the portion is not the same as a corresponding portion of the stored packet header.

3. The method of claim 1, further comprising disabling the comparing and generating, and transmitting the packet with the packet header and without the comparison vector based on a threshold associated with a plurality of comparisons each corresponding to a different packet header.

4. The method of claim 1, further comprising storing the packet header of the packet in a first portion of a header buffer of a transaction layer to replace the stored packet header.

5. The method of claim 1, further comprising receiving the packet and the comparison vector in a receiver coupled to the transmitter and obtaining a header corresponding to the packet header of the packet from a header buffer of the receiver.

6. The method of claim 5, further comprising accessing the header buffer based on a type of the packet and a value of the comparison vector.

7. The method of claim 1, further comprising compressing link layer packets with a third compression technique different than a first compression technique used for data and header packets, wherein if the first compression technique utilizes frequency tables, then maintaining a separate frequency table for the link layer packets.

8. An apparatus comprising:
a transaction layer including a header buffer, a comparator, and a generator comprising:
the header buffer to store a previous packet header of a previous packet transmitted from a transmitter, the header buffer including a plurality of entries each to store a previous packet header for a packet type;
the comparator to compare a packet header of a packet to be transmitted and a previous packet header stored in an entry of the header buffer corresponding to the packet type of the packet to be transmitted;
the generator to generate a bit vector based on the comparison and to transmit the packet with the bit vector and without at least a portion of the packet header based on the comparison;
the transaction layer including separate header compression logic and data compression logic, the header compression logic including the header buffer, the comparator, and the generator, and the data compression logic to compress a data portion of the packet using a different compression technique; and
wherein the data compression logic is based on frequency of symbols maintained in a frequency table and is to update the frequency table with information regarding each packet transmitted, and update a compression technique that generates a compressed encoding for symbols only once per a predetermined number of packets transmitted.

9. The apparatus of claim 8, further comprising control logic coupled to the comparator to disable the comparing and generating, wherein the transaction layer is to transmit the packet with the packet header and without the bit vector based on a threshold associated with a plurality of comparisons each corresponding to a different packet header.

10. The apparatus of claim 9, wherein the control logic is to cause a compression indicator of the packet header to be of a first state if the packet header compression is enabled and of a second state if the packet header compression is disabled.

11. The apparatus of claim 8, further comprising a packet formation logic to generate the packet header and to store the packet header of the packet in a first portion of the header buffer, the first portion corresponding to a type of the packet.

12. A system comprising:
a transmitter coupled to an interconnect, the transmitter including first compression logic to compare a packet header of a packet to a stored packet header corresponding to a last packet of the same type as the packet sent from the transmitter, generate a comparison vector based on the comparison, the comparison vector having a plurality of bits each to indicate whether a portion of the packet header matches a corresponding portion of the stored packet header, and transmit the packet from the transmitter with the comparison vector and without the packet header if the packet header and the stored packet header match, compress a data portion of the packet with a different compression technique and update a frequency table of the different compression technique with information regarding each packet transmitted, and update a tree of the different compression technique only once per a predetermined number of packets transmitted;
a receiver coupled to the interconnect, the receiver including second compression logic to receive the packet and the comparison vector and obtain a header corresponding to the packet header of the packet from a header buffer of the receiver; and
a dynamic random access memory (DRAM) coupled to the receiver and the transmitter.

13. The system of claim 12, wherein the first compression logic includes a header buffer to store the stored packet header, the header buffer including a plurality of entries each to store a packet header for a packet type, and a comparator to generate the comparison vector.

14. The system of claim 12, wherein the second compression logic is to access the header buffer of the receiver based on a type of the packet and a value of the comparison vector.

* * * * *